(12) United States Patent
Unfried

(10) Patent No.: US 9,009,695 B2
(45) Date of Patent: Apr. 14, 2015

(54) METHOD FOR CHANGING OVER FROM A FIRST ADAPTIVE DATA PROCESSING VERSION TO A SECOND ADAPTIVE DATA PROCESSING VERSION

(75) Inventor: Johannes Unfried, Wein (AT)

(73) Assignee: Nuance Communications Austria GmbH, Vienna (AT)

( * ) Notice: Subject to any disclaimer, the term of this patent is extended or adjusted under 35 U.S.C. 154(b) by 1034 days.

(21) Appl. No.: 12/300,389

(22) PCT Filed: May 9, 2007

(86) PCT No.: PCT/IB2007/051734
§ 371 (c)(1),
(2), (4) Date: Nov. 11, 2008

(87) PCT Pub. No.: WO2007/132404
PCT Pub. Date: Nov. 22, 2007

(65) Prior Publication Data
US 2009/0125899 A1    May 14, 2009

(30) Foreign Application Priority Data
May 12, 2006 (EP) .................................... 06113888

(51) Int. Cl.
*G06F 9/44* (2006.01)
*G10L 15/28* (2013.01)
(Continued)

(52) U.S. Cl.
CPC . *G10L 15/28* (2013.01); *G06F 8/67* (2013.01); *G10L 15/065* (2013.01); *G10L 15/32* (2013.01)

(58) Field of Classification Search
CPC ............ G06F 15/16; G06F 8/67; G10L 15/28
USPC .................................. 717/168–178; 704/244
See application file for complete search history.

(56) References Cited

U.S. PATENT DOCUMENTS 4,864,622 A * 9/1989 Iida et al. ....................... 704/247
5,555,418 A * 9/1996 Nilsson et al. ................. 717/153
(Continued)

FOREIGN PATENT DOCUMENTS

CN      1081010 A      1/2004
DE    10127559 A1    12/2002
(Continued)

OTHER PUBLICATIONS

Official Communication dated Oct. 14, 2011 for Application No. CN 200780017032.0.
(Continued)

*Primary Examiner* — Wei Zhen
*Assistant Examiner* — Brahim Bourzik
(74) *Attorney, Agent, or Firm* — Wolf, Greenfield & Sacks, P.C.

(57) ABSTRACT

The invention relates to a method and to a system for changing over from a first adaptive data processing version (V1) on data processing means using at least one data model (dm) which is continuously adapted on the basis of data processing results to a second adaptive data processing version (V2) also using at least one data model (DM) to be continuously adapted, characterized in that, in a first phase, the second adaptive data processing version (V2) is used in parallel to the first data processing version (V1), thereby continuously adapting said at least one data model (dm) related to the first version (V1) as well as that data model (DM) related to the second version (V2), and in that the performance of data processing by means of the second version (V2) in checked to comply with a quality criterion, where after in a second phase, as soon as said criterion is met, the results of the data processing by means of the second version (V2) are outputted to be used. The invention further relates to a computer program product having a computer program recorded thereon which is adapted to carry out such a method.

18 Claims, 3 Drawing Sheets

Figure 1:
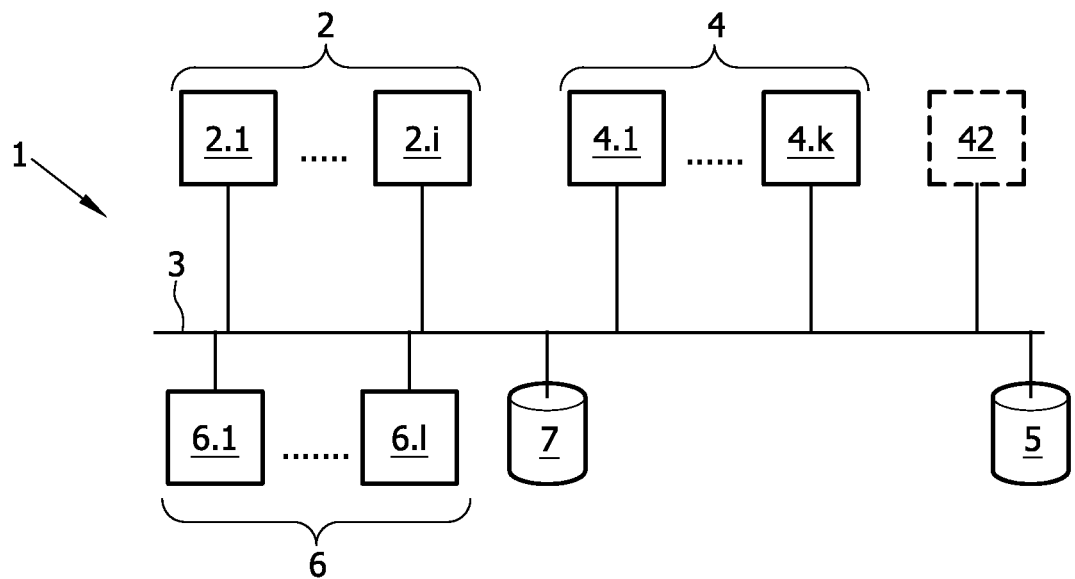

(51) Int. Cl.
*G06F 9/445* (2006.01)
*G10L 15/065* (2013.01)
*G10L 15/32* (2013.01)

(56) References Cited

U.S. PATENT DOCUMENTS

| | | | | |
|---|---|---|---|---|
| 5,917,891 | A * | 6/1999 | Will | 379/88.03 |
| 5,983,242 | A | 11/1999 | Brown et al. | |
| 6,167,117 | A * | 12/2000 | Will | 379/88.03 |
| 6,173,259 | B1 * | 1/2001 | Bijl et al. | 704/235 |
| 6,629,315 | B1 * | 9/2003 | Naylor | 717/168 |
| 6,704,432 | B2 | 3/2004 | Eversole et al. | |
| 6,879,956 | B1 * | 4/2005 | Honda et al. | 704/244 |
| 8,219,407 | B1 * | 7/2012 | Roy et al. | 704/275 |
| 8,255,219 | B2 * | 8/2012 | Braho et al. | 704/251 |
| 2002/0143540 | A1 | 10/2002 | Malayath et al. | |
| 2002/0169605 | A1 * | 11/2002 | Damiba et al. | 704/235 |
| 2002/0194000 | A1 | 12/2002 | Bennet et al. | |
| 2003/0145315 | A1 | 7/2003 | Aro et al. | |
| 2003/0225719 | A1 | 12/2003 | Juang et al. | |
| 2003/0229825 | A1 * | 12/2003 | Barry et al. | 714/38 |
| 2004/0148165 | A1 | 7/2004 | Beyerlein | |
| 2004/0249867 | A1 * | 12/2004 | Kraiss et al. | 707/203 |
| 2006/0184838 | A1 * | 8/2006 | Singonahalli et al. | 714/45 |
| 2007/0106685 | A1 * | 5/2007 | Houh et al. | 707/102 |
| 2008/0120109 | A1 * | 5/2008 | Ding | 704/255 |

FOREIGN PATENT DOCUMENTS

| | | |
|---|---|---|
| JP | 2000-259420 A | 9/2000 |
| WO | 9401819 A | 1/1994 |
| WO | WO 02/099785 A | 12/2002 |

OTHER PUBLICATIONS

Official Communication dated Aug. 24, 2009 for Application No. EP 07735815.8.

Official Communication dated Apr. 19, 2010 for Application No. EP 07735815.8.

Official Communication dated Jul. 23, 2012 for Application No. CN 200780017032.0.

Official Communication dated Jun. 13, 2012 for Application No. EP 07735815.8.

Official Communication dated May 22, 2012 for Application No. JP 2009-508650.

PCT Search Report dated Feb. 19, 2008 for Application No. PCT/IB2007/051734.

PCT Preliminary Report on Patentability dated Nov. 17, 2008 for Application No. PCT/IB2007/051734.

Office Action for CN 200780017032.0 mailed Mar. 1, 2013.

Office Action for JP 2009-508650 mailed Sep. 18, 2012.

* cited by examiner

METHOD FOR CHANGING OVER FROM A FIRST ADAPTIVE DATA PROCESSING VERSION TO A SECOND ADAPTIVE DATA PROCESSING VERSION

This application is a national stage application under 35 U.S.C. §371 of International Application No. PCT/IB2007/051734, filed May 9, 2007, which claims priority to European Application No. 06113888.9, filed May 12, 2006, the entire disclosure of each of which is herein incorporated by reference in its entirety.

The present invention relates generally to a method as well as to a system for changing over from a first adaptive data processing version on a data processor using at least one first data model continuously adapted on the basis of data processing results to a second adaptive data processing version using at least one second data model to be continuously adapted. Furthermore, the invention relates to a computer program product, which may be used to carry out such a method for changing over from a first data processing version to a second one.

It is a problem well known in the art, especially in the field of word processing, to maintain forwards compatibility and backwards compatibility when changing over from old (first) processing software versions to new ones (second ones). In connection therewith, it is known to use specific identifying bits for preserving the integrity of data files when using different software versions which are potentially partially incompatible; see for example U.S. Pat. No. 5,983,242 A. Also, it has become known to include "water marks" in data files to be able to indicate whether a specific file is based on a former or a newer version of an application program; see for example U.S. Pat. No. 6,704,432 B. However, these known technologies concern the problem how to process one and the same data when different versions of application software are present in a system of computing means, such as a personal computer.

The problem of using a new program version instead of an old one, however, is quite more serious when specific adaptive data models are used when running the program to process large amounts of data, and where the data models are continuously "trained", i.e. adapted, on the basis of corrected results, as for instance is the case in the field of automatic speech recognition and conversion of sound files into text files. When converting speech data to text files on the basis of speech recognition input data, it is known to use specific adaptive data models in view of the fact that some kinds of these speech data are user-dependent. In particular, it is usual to use an acoustic reference data model containing phonetics characteristic for the respective user; furthermore, a language data model may be used, e.g. to consider specific probabilities for word transitions dependent on the specific user, since an author often uses a given word Y following to a given word X; then, a data model may be based on a lexicon which contains recognizable words including information how they are pronounced by the specific users; and it is also possible to use a grammar data model, where data referring to number grammar, date grammar etc. are included.

During data processing, that is during automatic speech recognition, and automatic conversion of speech data to text files, some of these data are continuously adapted in a feedback loop, with an essential increase in recognition accuracy by this continuous adaption or training. For instance, by this feedback on the basis of the processing results, new words can be added to the lexicon data model; the language data model may be updated so that it represents the users style of speaking better and better; the grammar, too, gets updated with new grammar expressions; and the phonetics in the acoustic reference data model are updated to better resemble the users specific articulation. All this adaptive work with respect to the data models is rendered possible by the feedback, when automatically converted files are corrected thereafter by listening to the sound files and reading the converted text files in correlation therewith.

Similar situations are encountered in other data processing systems where huge amounts of data are to be processed, based on the use of data models with continuous adaption thereof in a feedback loop, on the basis of data processing results, as, have not been kept to allow pre-training of a new model, or have been kept but do not allow for a pre-training of a new model, for instance, systems with data processing on the basis of algorithm—dependent picture data models, e.g. in the case of satellite picture transmissions, in the case of establishing maps, etc.; or systems in the field of gene analyzes; or systems in the field of related sound data; and any other fields where large amounts of data are to be imaged on the basis of adaptive data models.

In such adaptive data model systems, from time to time, new data processing software versions are introduced which have the advantage that improvements with respect to the used algorithm, for instance to perform speech recognition, may lead to higher performance. However, these algorithm changes usually imply a change in the underlying data model, or even a new initial data model at all. In principle, in rather few cases, data models can simply be converted into new data models suited to be used by the new software version. However, in many cases, data models are not convertible at all, or it is not feasible to pre-adapt the data model as the correction of data would be too labor intensive. Namely, even if data models principally are accessible to a pre-adaption, such pre-adaption often is quite time-consuming and needs a complicated upgrade procedure. In particular, in the case of automatic speech recognition and of automatic conversion into text files, in general, the data models are optimized by large amounts of sound material, and it is typically not possible to keep that sound material when a new speech recognition software version is implemented, for migration purposes. Therefore, in the case of implementing a new speech recognition version (or generally, a new data processing version), when previous and continuously adapted data models can not be maintained, previously gained information, that is data models adapted during previous data processing, is lost since it must be started with an initial data model in connection with the new (second) data processing software version; this means that the user of such a system prefers to further use an old (first) software version, where already quite good recognition performance has been achieved on the basis of the continuously adapted data models. By changing over now to the new software version, this quality would be lost for a transition time since the continuously adapted old data model cannot be further used, and the new, initial data model has to be adapted when using the new, improved algorithms of the new software version until sufficient data have been trained into the new data model so that at least an adequate performance is reached. Due to this, many users tend to stick to the old software version with the adapted data models, so that the roll out and use of the new software version is hindered since the customers would expect a deterioration in recognition performance, and they refuse to switch over to the new software version (although, seen over a longer time period, this new version would allow to achieve a better speech recognition accuracy etc., in view of the improved algorithms comprised).

As far as data models principally would be accessible to an adaption with an outlook to the new software version, it should be borne in mind that for instance speech recognition systems often have 15,000 users connected, and each user has its own data models. To do such an initial adaption, to render a data model suited for a new software version, means for that example up to 20 MB per user are to be adapted which means that a collection of adaptation data of approximately 300 GB—and a corresponding 300 GB disk space—may be required.

Therefore, there is a long standing need for a solution to switch over from an old data processing version to a new one without loosing quality of the data processing results due to the necessity to fall back to an initial data model but nevertheless, to be in the position to switch over to the new software version, to gain advantage of the new and improved algorithms of the new version.

It is thus an object of the present invention to provide a method and a system for switching over from an old or first data processing version to a new or second data processing version, and where changing over from the first version to the second version is possible without loosing, at least substantially, the quality results as are already obtained with the first version.

Furthermore, it is an object of the invention to provide a computer program product which contains a computer program which, when loaded into a data processor is adapted to carry out the method according to the present invention, for switching over from a first software version to a second one without loss of performance.

According to a first aspect of the present invention, a method is provided for changing over from a first adaptive data processing version on data processing means using at least one first data model which is continuously adapted on the basis of data processing results to a second adaptive data processing version also using at least one second data model to be continuously adapted, characterized in that, in a first phase, the second adaptive data processing version is used in parallel to the first data processing version, thereby continuously adapting the at least one first data model related to the first version as well as the at least one second data model related to the second version, and in that the performance of data processing by means of the second version in checked to comply with a quality criterion, whereafter in a second phase, as soon as the quality criterion is met, the results of the data processing by means of the second version are outputted to be used.

In accordance with a second aspect of the present invention, the invention provides for a system comprising a data processor having a first data processing version for processing data using at least one first data model which is continuously adapted on the basis of data processing results, characterized in that the data processor is arranged to run a second data processing version in parallel to the first data processing version and using at least one second data model which is continuously adapted on the basis of data processing results, and that the dataprocessor is arranged to switch over from outputting the data processing results of the first data processing version to the results of the second data processing version as soon as an adequate quality of the results of the second data processing version is achieved by the continuous adaption of the respective at least one data model.

According to a further aspect of the present invention, a computer program product is provided which has a computer program recorded thereon which is adapted to carry out the changing over method according to the present invention. In particular, the computer program recorded on that computer program product additionally includes software adapted to carry out said second adaptive data processing version, too.

The present invention is based on the idea to configure the new, i.e. the second data processing version, in the background, in the "shadow", to currently adapt the new data model or data models associated with the new version in the background until this adapted data model (or data models) provides an equal or better performance as the former data model, the "legacy" model, in connection with the first data processing version. Until that time when the second version issues comparable or better results, the results based on the former data model and obtained by the first data processing version are delivered to the user. The changing over or switching from the first version and first data model(s) to the second version and second data model(s) can be done in a totally automatic way, and to this end, it may be provided that a given amount of data trained into the data model related to the second adaptive data processing version is used as predetermined criterion, that the amount of adapted data is compared with the given amount of data, and when reaching said given amount of data, an automatic change over to the use of the results of the data processing by means of the second version is caused. This solution is a very convenient and computer-time-saving solution. It would, however, also be possible to switch over between the two versions on the basis of a direct performance comparison, and with respect thereto, it is of particular advantage if the results of the data processing by means of the second version are automatically compared with the results of the data processing by means of the first version with respect to performance, and when said second version results are equal or superior to the first version results, it is automatically changed over to the use of the second version results.

On the other hand, it would also be possible to provide for a forced switching from the first version to the second version, and in connection therewith, it would be useful if the performance of the second data processing version is estimated in relation to the first version results, and in case of adequate performance, change over to the use of the second version results is forced.

Thus, preferred embodiments of the system of the present invention are characterized in that a given amount of data trained into the data model related to the second adaptive data processing version is used as a predetermined quality criterion, with means for comparing the amount of adapted data with the given amount of data, and for an automatically changing over to the use of the results of the data processing by means of the second version when reaching said given amount of data; or by means for comparing the results of the data processing by means of the second version with the results of the data processing by means of the first version, and for automatically changing over to the use of the second version results when said second version results are superior to the first version results.

The present invention is particularly useful in connection with automatic speech recognition and automatic conversion of speech data into text files which then are corrected. In connection therewith, it is particularly advantageous to continuously adapt the specific acoustic reference data models such as phonetic data models and language data models for the respective users; nevertheless, continuous adaptation can also be applied to the language data model as well as to the grammar and to the lexicon data models, as is known per se. Advantageously, as already mentioned above, the present invention can also be used for other data processing where large amounts of data are processed using data models, which are continuously adapted by feedback on the basis of data processing results.

Figure 2:
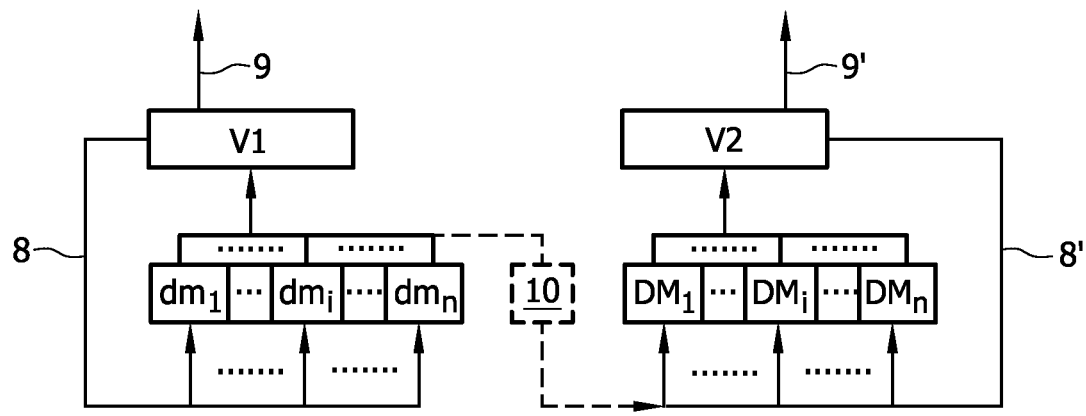
Figure 3:
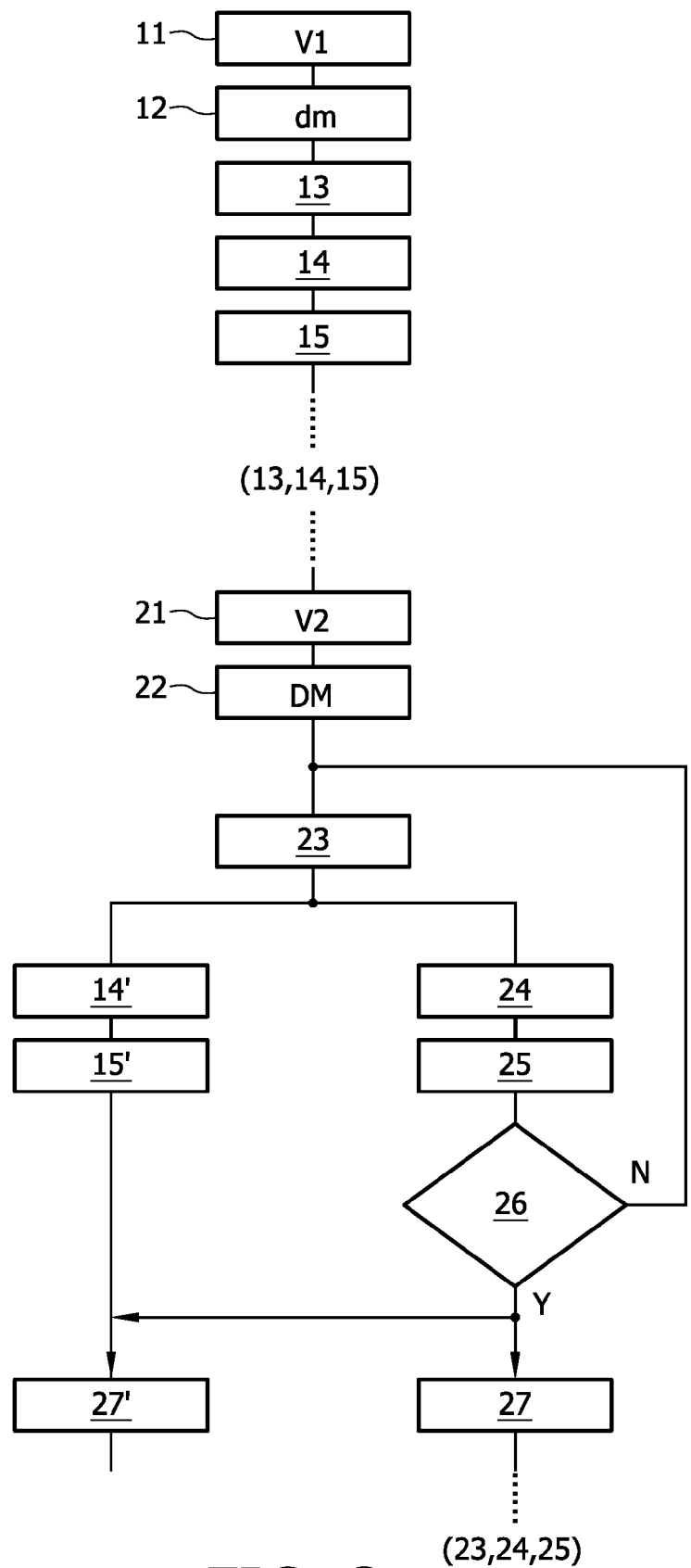
Figure 4:
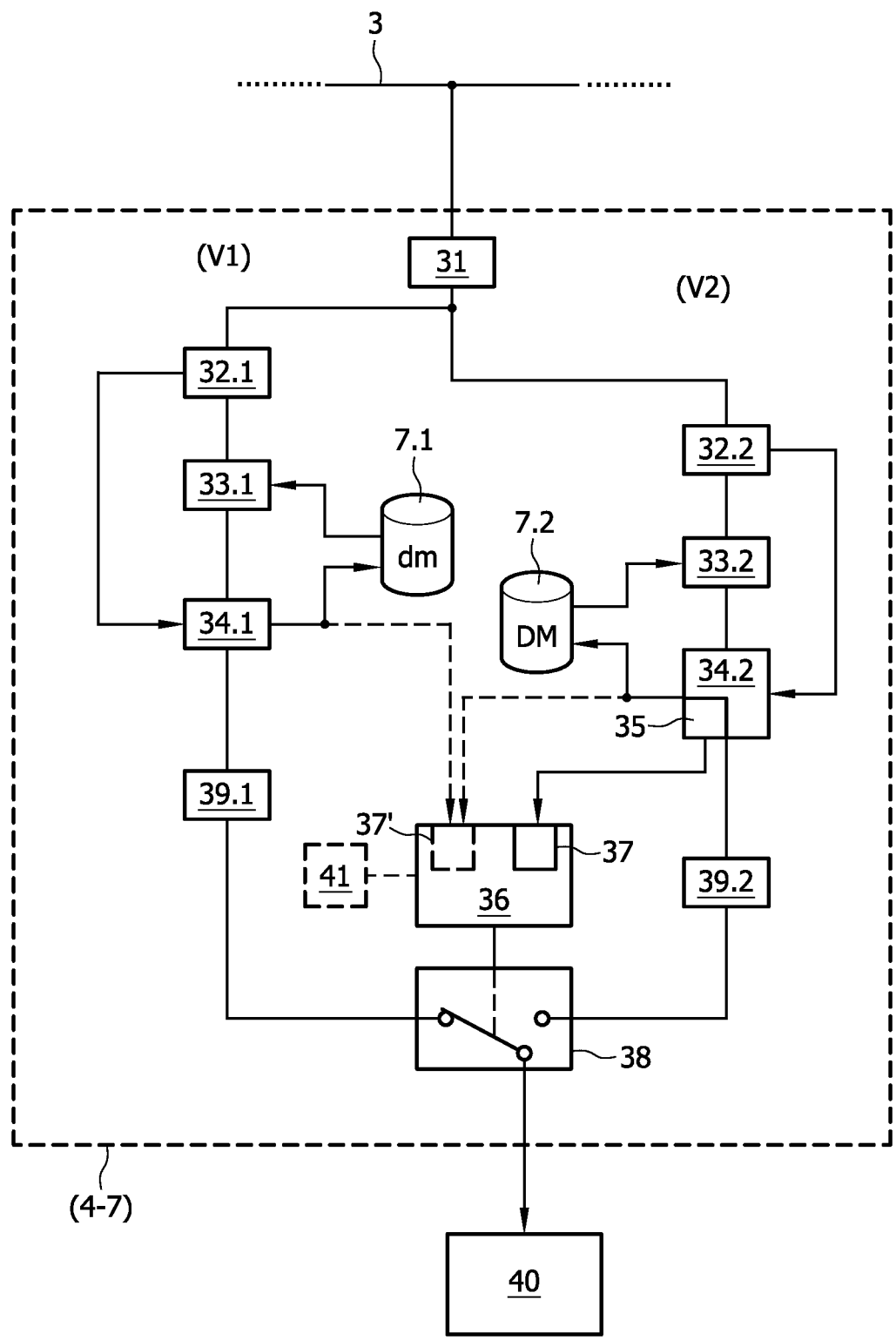

The above and other aspects, objects, features and advantages of the present invention will become apparent from the following detailed description of preferred embodiments read in conjunction with, and reference to, the accompanying drawings, wherein:

FIG. 1 represents a schematic layout of a data processing system, namely in particular of a speech recognition and adaptation system where speech data are automatically converted into text files which are then corrected on the basis of sound files received, and where corresponding feedback is used to adapt stored data models;

FIG. 2 schematically represents the use of a first and a second data processing software version in parallel to each other, with parallel adaption of associated data models, and with the use of the results of the data processing of one version whereas the second version is run in the background, in parallel to the first version, to be in position to adapt the data models pertaining the second version on a sufficient scale;

FIG. 3 depicts a flow chart illustrating the method according to the present invention with respect to running a second data processing version in parallel to a first one from which the results are used until the results of the second version are adequate; and FIG. 4 schematically represents a system for running a second data processing software version parallel to a first version, and for switching over from the first version to the second one as soon as at least comparable performance is obtained when using the second version.

The present invention will now be described in detail with reference to the drawings in which preferred embodiments of the invention are shown, and in which like reference numbers represent like elements.

In FIG. 1, a schematic representation of a data processing system 1 is shown; more in detail, as an example of such a system, a system 1 for automatically recognizing recorded sound data and for converting sound files into text files which thereafter are manually corrected on the basis of said sound files is shown. This system 1 comprises a plurality of record stations 2.1 . . . 2.i, generally referred to by the reference numeral 2 which each for example comprise a personal computer (PC) with audio devices (microphone, loudspeaker; not represented) to record and playback speech data which, after recording, are outputted to a network 3, for instance a Local Area Network/Wide Area Network (LAN/WAN) network 3, as sound files (speech files). Further connected to this network 3 are recognition/adaptation stations 4, more in detail 4.1 . . . 4.k, where the sound files outputted by the record stations 2 and stored in a data base 5, are automatically recognized and converted into text files, as is well known in the art. Also, these recognition/adaption stations 4 may comprise PCs. The data base or file server 5 contains the sound files, and furthermore, the recognized text files as well as corrected text files. As to the correction of the automatically obtained text files, a plurality of correction stations 6 (again comprising e.g. PCs) is provided and connected to the network 3; by using these correction stations 6, or 6.1 . . . 6.1 in detail, the text files as automatically obtained, and as stored in the data base 5, are manually corrected by persons who are listening to the corresponding sound files when doing the correction work. The corrections provided for are then used as a feedback for data models stored in a further data base 7 containing data base meta information, and in particular containing respective user-specific data models, as in particular acoustic reference models comprising data referring to the user-specific phonetics; a language data model which, too, is user-specific and refers to probabilities for word transitions for the respective users; furthermore, a grammar data model; as well as a lexicon data model containing the recognizable words including information how they are pronounced by the respective users. All these data models are stored in the database 7. In the following, it will be referred to such data models, when it is referred to "at least one" data model, or to "a" data model, it should be clear that in fact, a large number of such data models, namely several models for each of a large number of users, are present.

As far as the speech recognition system 1 has been described now, such a system is well known in the art.

For the automatic speech recognition and conversion, the recognition adaptation stations 4 use a (first) software version (V1), compare FIG. 2, which uses a specific V1-algorithm as well as pertaining V1 data models stored in the data base 7. As already mentioned above, these V1 data models (dmi) are continuously adapted during automatic speech recognition, conversion and correction of the text files, on the basis of the feedback of the corrected text files. This feedback can comprise data referring to the language models and reflecting the respective users style of speaking in an improved manner, updated phonetics for the acoustic reference data models, which are suited to better represent the users articulation, new grammar expressions for updating the grammar data models, as well as new words which are added to the lexicon data models. Due to this continuous adaptation of the data models, the recognition accuracy will be increased.

Nevertheless, from time to time, a new data processing version (software version), (V2) in FIG. 2, and having improvements regarding to the used algorithms, here to perform automatic speech recognition and conversion, is to be implemented. Due to algorithm changes where e.g. new parameters or variables are introduced, new underlying data models (Dmi) are to be used, too, and in most cases, it is not possible to convert the old data models dmi used with the former version V1 to the new data models DMi to be used with the second, new version V2. Even if such a conversion or a pre-adaption based on data collected in the past in connection with the V1 model should be possible, this conversion or pre-adaption is rather time-consuming and storage-consuming and very complicated, in particular when one bears in mind that for instance 15,000 users (corresponding to 15,000 record stations 2) may be connected in the system 1. Therefore, although recognition performance based on the V2 version using the related V2 data models would allow to achieve better recognition accuracy than the first software version V1, the users tend to stick to the old software version V1 since by the past continuous data model adaptation, at the moment, the speech recognition performance is better than that of the software version V2 on the basis of the pertaining initial data models which are data models without trained data. The situation would be the same if the new (second) V2 software version would contain the V1 algorithm, and could use the V1 data models by applying said V1 algorithm since then, no benefit would be derived from the new software version V2 with the improved V2 algorithm. Therefore, in fact, up to now, there has not existed any other possibility than to change over to the new V2 system version, accepting the disadvantage that the beginning, the V2 system performance on the basis of the initial V2 data models is poor.

In FIG. 2, it is schematically shown how speech recognition and conversion is performed by in the first processing version V1 on the basis of V1 data models dm1 . . . dmi . . . dmn (with i=1 . . . n), with a feedback loop 8 to continuously adapt said data models dmi, to improve the recognition performance. The conversion results (text files) are outputted at 9. Then, according to the present invention, now the second or new software version V2 is implemented in parallel to the first version V1, with the corresponding (initial) data models DM1 ... DMi ... DMn. By using a feedback loop 8', these V2 data models DMi are continuously adapted, too, when performing speech recognition conversion with said V2 version in parallel to the V1 processing. However, the results of this speech recognition conversion are outputted at 9' only from that time on when the data models DMi have been sufficiently adapted, so that the output results are at least equal results at the output 9 and obtained by using the first version V1.

In FIG. 2, the principal possibility to pre-adapt or convert the new V2 data models DMi by using data of the V1 data models dmi is schematically shown in broken lines by module 10, with the reservation that such a pre-adaption or conversion of data models is possible only on a reduced scale, if at all, as mentioned above. Therefore, parallel data models adaptation is done according to the present invention, compare feedback loops 8, 8', and after the transition time, it can than be switched over from the version V1 to the new version V2 without loss of recognition performance.

In FIG. 3, a flow chart illustrating the parallel implementation of versions V1, V2 and the changing over from the first version V1 to the second version V2 dependent on the level of adaption of the V2-related data models DM is shown. For simplification, it is referred to only one respective data model dm, or DM, respectively, whereas it should be self-evident that the number of data models, for instance four data models per user in the case of automatic speech recognition conversion, as mentioned above, is much larger.

According to FIG. 3, the first software version V1 is installed according to block 11. Furthermore, according to block 12, the V1-related data model dm, generation #1 is installed.

Thereafter, a sound file is recorded, compare block 13, whereafter this sound file is automatically recognized and converted into a text file on the basis of the V1 data model #1, and the automatically obtained text file is corrected, and an adaptation of the data model dm #1 is carried out on the basis of the corrections carried out in the text file; the text file is then delivered at an output; these steps are represented by block 14 in FIG. 3. It should be mentioned here that the automatic recognition and conversion is done in this example with respect to one specific user, on the basis of the data model associated with this user, and the data model dm is adapted on the basis of the so far available sound/recognized/corrected text triples. However, as mentioned above, a large number of users is connected in the system, and for each user, or each user-specific data model, corresponding data processing and adaption is to be subsumed.

It is of course not necessary to adapt the data model each time when a sound file is automatically recognized and converted into a text file, and the corresponding text file is corrected; instead, it is also possible to accumulate a number of such sound/recognized/corrected text triples, and to adapt the data model dm only after a predetermined amount of adaptation data has been obtained.

Block 15 in FIG. 3 refers to the presence of a now adapted data model (dm generation #2).

In the following, the steps according to blocks 13, 14, 15 are repeated again and again, and it may be assumed that the processes have ended up in a well-trained data model dm of a high generation.

At that stage, the second software version V2 is installed according to block 21, and according to block 22, the initial data model DM associated therewith is implemented. This second software version V2 together with its data model DM is then run in parallel to the first software version V1 with the data model dm of the higher generation. When now—for a specific user—a further sound file is recorded according to block 23, this sound file is again recognized and converted into a text file in an automatic way, by using version V1, according to block 14', as described above, and possibly, an updating or adaptation of the corresponding data model dm for the version V1 is obtained according to block 15'.

In parallel to these steps, the sound file is automatically recognized and converted into a text file on the basis of the second software version V2 and of the corresponding data model DM, and the text file obtained thereby is provided with the corrections as inputted when the text file is corrected according to block 14'. The corrections of the text file lead to an adaptation of the V2 data model DM, too, s. block 25 in FIG. 3. However, also here, a number of sound/recognized/corrected text triples can be accumulated before the V2 data model DM is adapted as described. In step 26, it is then checked whether the updated V2 data model is already beneficial, which is for instance decided on the basis of the amounts of data that have been trained into the V2 data model. If no, then the described parallel data processing on the basis of the versions V1 and V2 is continued by reverting to block 23. However, when the decision at step 26 proofs that at least adequate results may be obtained now by using the new software version V2 in combination with the now sufficiently trained data model DM which has been continuously adapted in the foregoing processing steps, then data processing only with version V2 is continued, s. block 27 in FIG. 3, and data processing with the V1 version on the basis of the V1 data model is stopped, s. block 27' in FIG. 3. Data processing, that means receiving, recognizing, converting and correcting of sound and text files, is now continued on the basis of the new software version V2 in combination with a corresponding updated data model DM alone, as is indicated in FIG. 3 with the hint to steps 23, 24, 25. Additionally, it should be clear that of course now the corrected text files obtained by using the version V2 and the continuously updated, adapted V2 data model is delivered at the output of the system (compare output 9' in FIG. 2).

FIG. 4 illustrates the present system in a block diagram-like manner, thereby showing the connection of a system 4 to 7 to the network 3 by an interface module 31. Then, in a rather schematic manner, two branches are shown, one branch each for a software version V1, or V2, respectively. According to modules 32.1 and 32.2, the receipt of an acoustic file or sound file is shown, whereafter the automatic recognition and conversion follows in modules 33.1 and 33.2 (compare also station 4 in FIG. 1). This automatic recognition and conversion of the speech file is carried out on the basis of the data models dm, and DM, respectively, as stored in the databases 7.1, and 7.2, respectively. It should be mentioned that the databases 7.1 and 7.2 may be parts of the database 7 as illustrated in FIG. 1.

The representation in FIG. 4 is insofar simplified for easier understanding as the storing of the speech file (sound file) in database 5 is not illustrated.

Hereafter, in the respective correction station 6 (FIG. 1), the converted text file obtained at the output of the automatic recognition and conversion module 33.1 or 33.2 is corrected, s. modules 34.1 and 34.2 in FIG. 4, or station 6 in FIG. 1. It should be mentioned here that one and the same correction work carried out at the specific correction station 6 leads to the file correction according to modules 34.1 and 34.2 as represented in FIG. 4. This correction issues in an adaptation of the data models dm in the data base 7.1 and DM in the data base 7.2; moreover, in the branch for the new software version V2, a counter module 35 is connected to the correction module 34.2 to count the amount of the trained (updated) data for the V2 data module DM, in particular in terms of kbyte, when the corresponding updating information is delivered to data base 7.2, and a corresponding information is delivered to a decision making and controlling module 36. The decision making and control module 36 includes a comparator module 37 where the received data with respect to the amount of adaption of the data module DM is compared with a predetermined and stored amount of data to be trained; as soon as this predetermined amount of data is reached, the module 36 activates a switching module 38 to automatically switch over from the V1 results output 39.1 to the V2 results output 39.2. The respective corrected V2 text files are delivered at module 40.

As an alternative for the automatic switching from V1 results to V2 results, it may be provided for to compare the respective resulting text files before correction, that this after automatic conversion or, more preferred, the amount of correction data necessary to correct the automatically converted text files, as is schematically illustrated in FIG. 4 by broken lines with a comparator at 37'. Still another possibility would be to forcedly activate the switching module 36 dependent on an estimation of the respective V1 and V2 results, as is again schematically shown in FIG. 4 by broken lines at 41.

As far as preferred embodiments of the present invention have been described above, it should yet be clear that various modifications are possible within the scope of the present invention. In particular, the invention also applies to other fields of data processing where huge amounts of data have to be used, in particular also to update data models, and where pre-training of a new initial data model is not possible in view of inadequate data of the previous data model, or in view of that this pre-training is too time-consuming, or since the V1 data model is not convertible at all into a V2 data model. For instance, the invention could be applied in the field of processing image data, for instance for video information as received from satellites, or huge amounts of sound data, or even genome sequence data.

An alternative embodiment, when compared with the system of FIG. 1, could also be to install a separate unit 42 where the second software version V2 is separately installed and run, namely in particular to relieve the recognition/adaption stations 4, as far as data processing work on the basis of the V2 version is concerned during the above mentioned transition time of parallel V1/V2 operation. Of course, this modification implies that when switching over from the V1 version to the V2 version, then the V2 version has to be installed or downloaded in the respective recognition/adaptation stations 4 to be able to process respective speech files which are then automatically converted into text files by using the version V2 and the associated data models DMi.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the system claims enumerating several means, several of these means can be embodied by one and the same item of computer readable software or hardware. The mere fact that certain measures are recited in mutually different dependent claims does not indicate that a combination of these measures cannot be used to advantage.

The invention claimed is:

1. A method for changing from a first adaptive speech recognizer associated with at least one first speech recognition data model to a second adaptive speech recognizer associated with at least one second speech recognition data model, the method comprising using at least one processor to:
   execute the first adaptive speech recognizer to process speech data using the at least one first speech recognition data model to provide associated first text, and to adapt the at least one first speech recognition data model based at least in part on the first text;
   execute the second adaptive speech recognizer to process the speech data using the at least one second speech recognition data model to generate associated second text, and to adapt the at least one second speech recognition data model based at least in part on the second text, wherein the first and second text generated by the first and second adaptive speech recognizers, respectively, are available for a same use contemporaneous with executing the first adaptive speech recognizer and the second adaptive speech recognizer;
   determine whether the performance of the second adaptive speech recognizer complies with at least one quality criterion;
   when the performance of the second adaptive speech recognizer does not comply with the at least one quality criterion, output the first text for use; and
   when the performance of the second adaptive speech recognizer does comply with the at least one quality criterion, output the second text for use in place of the first text,
   wherein the performance of the second adaptive speech recognizer improves as a result of adapting the at least one second speech recognition data model during a period when the first and second adaptive speech recognizers are executed in parallel on the speech data and the first text provided by the first speech recognizer is output for use,
   processing the speech data by the second adaptive speech recognizer results in training data used, at least in part, to adapt the at least one second speech recognition data model, and wherein the performance of the second adaptive speech recognizer complies with the at least one quality criterion when the amount of training data exceeds a threshold amount.

2. The method according to claim 1, wherein the performance of the second adaptive speech recognizer complies with the at least one quality criterion when an estimated performance of the second adaptive speech recognizer matches or exceeds an estimated performance of the first adaptive speech recognizer.

3. The method according to claim 1, the method further comprising comparing the second text to the first text, wherein the performance of the second adaptive speech recognizer complies with the at least one quality criterion when the second text is determined to be equal to or better than the first text in accurately representing the speech data.

4. The method according to claim 1, wherein each of the at least one first speech recognition data model and the at least one second speech recognition data model, respectively, comprises at least one model selected from the group consisting of an acoustic model, a language model, a grammar model, and a lexicon model.

5. At least one non-transitory computer-readable storage device having a computer program recorded thereon which, when executed on at least one processor, performs a method for changing from a first adaptive speech recognizer associated with at least one first speech recognition data model to a second adaptive speech recognizer associated with at least one second speech recognition data model, the method comprising:

executing the first adaptive speech recognizer to process speech data using the at least one first speech recognition data model to provide associated first text and, to adapt the at least one first speech recognition data model based at least in part on the first text;

executing the second adaptive speech recognizer to process the speech data using the at least one second speech recognition data model to generate associated second text, and to adapt the at least one second speech recognition data model based at least in part on the second text, wherein the first and second text generated by the first and second adaptive speech recognizers, respectively, are available for a same use contemporaneous with executing the first adaptive speech recognizer and the second adaptive speech recognizer;

determining whether the performance of the second adaptive speech recognizer complies with at least one quality criterion;

when the performance of the second adaptive speech recognizer does not comply with the at least one quality criterion, outputting the first text for use; and when the performance of the second adaptive speech recognizer does comply with the at least one quality criterion, outputting the second text for use in place of the first text, wherein the performance of the second adaptive speech recognizer improves as a result of adapting the at least one second speech recognition data model during a period when the first and second adaptive speech recognizers are executed in parallel on the speech data and the first text provided by the first adaptive speech recognizer is output for use, wherein processing the speech data by the second adaptive speech recognizer results in training data used, at least in part, to adapt the at least one second speech recognition data model, and wherein the performance of the second adaptive speech recognizer complies with the at least one quality criterion when the amount of training data exceeds a threshold amount.

6. A data processing system configured to switch from a first adaptive speech recognizer associated with at least one first speech recognition data model to a second adaptive speech recognizer associated with at least one second speech recognition data model, the system comprising:

at least one storage medium for storing the first adaptive speech recognizer and the second adaptive speech recognizer; and at least one processor capable of accessing the at least one storage medium, the at least one processor configured to:

execute the first adaptive speech recognizer to process speech data using the at least one first speech recognition data model to provide associated first text and, to adapt the at least one first speech recognition data model based at least in part on the first text;

execute the second adaptive speech recognizer to process the speech data using the at least one second speech recognition data model to generate associated second text, and to adapt the at least one second speech recognition data model based at least in part on the second text, wherein the first and second text generated by the first and second adaptive speech recognizers, respectively, are available for a same use contemporaneous with executing the first adaptive speech recognizer and the second adaptive speech recognizer;

determine whether the performance of the second adaptive speech recognizer complies with at least one quality criterion;

when the performance of the second adaptive speech recognizer does not comply with the at least one quality criterion, output the first text for use; and when the performance of the second adaptive speech recognizer does comply with the at least one quality criterion, output the second text for use in place of the first text, wherein the performance of the second adaptive speech recognizer improves as a result of adapting the at least one second speech recognition data model during a period when the first and second adaptive speech recognizers are executed in parallel on the speech data and the first text provided by the first adaptive speech recognizer is output for use, wherein processing the speech data by the second adaptive speech recognizer results in training data used, at least in part, to adapt the at least one second speech recognition data model, and wherein the performance of the second adaptive speech recognizer complies with the at least one quality criterion when the amount of training data exceeds a threshold amount.

7. The system of claim 6, wherein the performance of the second adaptive speech recognizer complies with the at least one quality criterion when an estimated performance of the second adaptive speech recognizer matches or exceeds an estimated performance of the first adaptive speech recognizer.

8. The system of claim 6, wherein the performance of the second adaptive speech recognizer complies with the at least one quality criterion when the second text is evaluated as being equal to or better than the first text in accurately representing the speech data.

9. The system of claim 6, wherein each of the at least one first speech recognition data model and the at least one second speech recognition data model respectively comprises at least one model selected from the group consisting of an acoustic model, a language model, a grammar model, and a lexicon model.

10. The at least one non-transitory computer-readable storage device of claim 5, wherein the performance of the second adaptive speech recognizer complies with the at least one quality criterion when an estimated performance of the second adaptive speech recognizer matches or exceeds an estimated performance of the first adaptive speech recognizer.

11. The at least one non-transitory computer-readable storage device of claim 5, wherein the performance of the second adaptive speech recognizer complies with the at least one quality criterion when the second text is evaluated as being equal to or better than the first text in accurately representing the speech data.

12. The at least one non-transitory computer-readable storage device of claim 5, wherein each of the at least one first speech recognition data model and the at least one second speech recognition data model respectively comprises at least one model selected from a group consisting of an acoustic model, a language model, a grammar model, and a lexicon model.

13. The method of claim 1, wherein when the performance of the second adaptive speech recognizer does comply with the at least one quality criterion, execution of the second adaptive speech recognizer to process further speech data is continued and execution of the first adaptive speech recognizer is stopped.

14. The method of claim 4, wherein the at least one model selected from the group consisting of the acoustic model, the language model, the grammar model, and the lexicon model comprises a model adapted according to speech from a specific user.

15. The at least one non-transitory computer-readable storage device of claim 5, wherein when the performance of the second adaptive speech recognizer does comply with the at least one quality criterion, execution of the second adaptive speech recognizer to process further speech data is continued and execution of the first adaptive speech recognizer is stopped.

16. The at least one non-transitory computer-readable storage device of claim 12, wherein the at least one model selected from the group consisting of the acoustic model, the language model, the grammar model, and the lexicon model comprises a model adapted according to speech from a specific user.

17. The system of claim 6, wherein when the performance of the second adaptive speech recognizer does comply with the at least one quality criterion, execution of the second adaptive speech recognizer to process further speech data is continued and execution of the first adaptive speech recognizer is stopped.

18. The system of claim 9, wherein the at least one model selected from the group consisting of the acoustic model, the language model, the grammar model, and the lexicon model comprises a model adapted according to speech from a specific user.

* * * * *